March 19, 1974     W. NASCHWITZ ET AL     3,798,197
METHOD FOR THE MANUFACTURE OF LATEX BONDED
ASBESTOS COVER LAYERS AND COVERS PRODUCED
Filed Jan. 21 1972
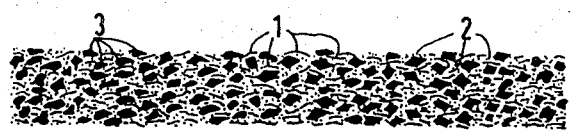

United States Patent Office 3,798,197
Patented Mar. 19, 1974

3,798,197
METHOD FOR THE MANUFACTURE OF LATEX BONDED ASBESTOS COVER LAYERS AND COVERS PRODUCED
Walter Naschwitz and Elisabeth Knust, Erlangen, Germany, assignors to Siemens Aktiengesellschaft, Munich, Erlangen and Berlin, Germany
Filed Jan. 21, 1972, Ser. No. 219,684
Claims priority, application Germany, Jan. 29, 1971, P 21 04 333.4
Int. Cl. C08c 11/16; H01m 27/00, 3/02
U.S. Cl. 260—41.5 A
10 Claims

ABSTRACT OF THE DISCLOSURE

A process for the production of latex bonded cover layers for electrochemical cells, particularly fuel cells, is described. Amphibole asbestos, particularly anthophyllite asbestos, bundles are broken down by a cationic wetting agent. The nonbroken-down particles are removed. A suspension is made from the asbestos fibers and filler substances in the form of powders, with a grain size of up to $100\mu$, which are stable in acid electrolyte, have ionic conductivity and can be swelled to several times their volume. Bentonite and cationic ion exchangers are particularly suitable as the filler substances. The suspension is mixed with an acid resistant latex and formed into a finished cover layer.

---

The present invention relates to a method for the manufacture of latex bonded asbestos cover layers for electrochemical cells, particularly fuel cells, with an acid electrolyte. The invention also describes the covers produced.

The use of asbestos cover layers in electrochemical cells is known. Latex bonded asbestos cover layers have proven themselves to be practical, for instance, for application in fuel cells with an alkaline electrolyte. Therefore, it has been attempted to use also asbestos cover layers in fuel cells with an acid electrolyte. Here, it was however, found that such cover layers are unstable in an acid medium, the cause for which can be traced to the content of no acid resistant asbestos paper such as chrysotile asbestos.

The problem, therefore, was to develop cover layers for electrochemical cells with an acid electrolyte with an equally as good behavior as the already known cover layers in electrochemical cells with an alkaline electrolyte, i.e. particularly, acid resistant cover layers.

The cover layers should have sufficient mechanical strength and stability in 2.5 m. $H_2SO_4$ at temperatures up to 60° C., at the same time being capable of simple and economical production. Also required are high electric conductivity (the electric resistivity should be less than 1.0 ohm·$cm^2$, if possible), hydrophilic properties and gas-tightness in the electrolyte saturated condition up to an operating pressure of 0.16 to 0.20 newtons/$mm^2$ (approximately 1.6 to 2.0 atm. g.).

The cover layers used to now, in fuel cells with an acid electrolyte consist, for instance, of acid resistant metal oxides bonded with polytetrafluorethylene or polyethylene and have the disadvantage that the cover layers must be sintered and contain hydrophobic binders.

It has, therefore, been attempted to manufacture cover layers by using asbestos types, which were considered as acid resistant. For this purpose, it was first investigated whether suitable cover layers can be manufactured particularly by using amphibole asbestos which, in the literature, is called acid resistant.

A binding agent is necessary for the manufacture of usable cover layers, and a suitable binding agent, therefore, also had to be found. The binding agent must be stable in 2.5 m. $H_2SO_4$ at temperatures of up to 60° C.; it must not be attacked by air, oxygen and hydrogen. This binding agent should be hydrophilic and it must be technologically processable in a simple manner.

From a multitude of latexes investigated, these among others found to be most suitable are based on mixed polymers containing styrene and butadiene or vinyl pyridine, respectively. The binding agent finally found to be the most suitable, which is also used in asbestos cover layers for electrochemical cells with an alkaline electrolyte, was a copolymer of butadiene, styrol and acrylonitrile.

Cover layers were prepared from the above-mentioned amphibole asbestos types with the use of this binding agent. The binding agent was given a chemical after treatment in the finished cover layer in order to produce hydrophilic groups, wherein carboxyl groups were created by saponification of the nitrile groups with an alkali solution. Subsequently, the cover layers were washed with water to neutrality and were tested in 2.5 m. $H_2SO_4$ at 60° C. for a period of 90 days.

Although it was found in these investigations that the cover layers were, per se, usable, their application was limited by the acid susceptibility of the amphibole asbestos used. It was found that in time, the cover layers lost their flexibility and became brittle. Partly, a considerable increase in surface and losses in weight took place. The cause of this may be that amphobile asbestos contains acid soluble components such as iron oxides, which are gradually dissolved. This also applies to the blue asbestos (crocidolite) which is described as acid resistant in the literature.

The reason for the acid susceptibility, found in these investigations, of the amphobile asbestos, which generally was considered as acid resistant, might possibly be that the asbestos was subjected to a hydrolyzing process prior to use.

As already mentioned, however, the knowledge was also gained from the investigations that the cover layers would in principle be usable if their acid resistance could be increased. The basic usability was shown, among other things, by the fact that the cover layers were gas-tight in the electrolyte saturated condition up to a gas pressure of 0.13 to 0.14 newtons/$mm^2$ (approximately 1.3 to 1.4 atm. g.).

It is an object of the present invention to find a way to manufacture latex bonded asbestos cover layers in such a manner that they can maintain their function permanently in an acid medium.

According to the invention, this is achieved by the feature that amphibole asbestos, particularly anthophyllite asbestos, is upgraded by means of a cation active wetting agent up to the point of breaking down the fiber bundles and removing the not broken-down particles. A uniform suspension is prepared from the asbestos fibers and filler substances in the form of powders with a grain size up to $100\mu$ which are stable in an acid electrolyte, have ionic conductivity and can be swelled up to several times their volume. This suspension is then mixed with an acid resistant latex and is further processed up to the finished asbestos cover layer in a manner known, per se.

The method according to the invention is based on the information gained by the investigations, namely, that in the manufacture of the asbestos cover layers, the asbestos fiber bundles must be well broken-down and the not broken-down raw asbestos particles and the silicate particles contained in the asbestos must be removed. Furthermore, a filler substance that can be swelled is necessary, by which compression of the structure is avoided and gas tightness of the asbestos cover layers is achieved even at high gas pressures.

Stability in 2.5 m. $H_2SO_4$ at temperatures up to 60° C., high ionic conductivity and good swelling properties are required of the filler substances. From this point of view, the following materials were selected and tested for their usability: metals or metal oxides, respectively, zeolite, bentonite and cation exchangers, particularly with a styrene matrix. Metals or metal oxides, respectively, exhibit poor ion conductivity and cannot be swelled, but are highly resistant to the electrolyte. Zeolites show good ion conductivity, but swell little and are not sufficiently resistant to the electrolyte. Bentonites have good ion conductivity, very good swelling properties and show sufficient stability against the electrolyte. Cation exchangers show good ion conductivity and good stability against the electrolyte, the swelling properties are adequate to good, depending on the kind and extent of cross-linking. As suitable were found particularly such cation exchangers which are designated as macro porous.

From this it is concluded that particularly bentonite and cation ion exchangers and especially those on a styrene basis, meet the requirements placed on the filler substance. The bentonites, which are aluminum silicates, exhibit the advantageous behavior that they can swell up to ten times their volume when they absorb electrolyte. Cation exchangers are highly suited as filler substances due to their properties, such as good ion mobility, stability in the pH ranges from 0 to 14 and at temperatures up to 120° C., as well as their ability to swell.

The filler substances are pretreated, if desired. Ion exchangers are commercially available mostly in spherical form with a grain size of 0.8 to 1.2 mm. in the swelled condition and must therefore be comminuted. This is done advantageously by milling under water with steel balls of 2 mm. diameter. Dry milling, in which the material is first dried for 24 hours at 110° C. furnishes a material which exhibits poor properties when used in asbestos cover layers. Bentonite is commercially available with a grain size of 2 to $60\mu$ and therefore, does not need to be pretreated.

The stability was ascertained by determining the weight loss when storing the materials in 2.5 m. $H_2SO_4$ at 60° C. Here, the bentonites showed sufficient stability. Cation exchangers, particularly those with a styrene matrix, excel in their chemical stability in all ranges of pH. Under the above-named test conditions, they show no weight loss even after 30 days and are, therefore, very well suited for continuous operation.

The practical execution of the method according to the invention will now be explained in more detail with the aid of an example of an embodiment.

First, the asbestos must be prepared. Under the microscope one recognizes, for instance in an anthophyllite asbestos, many silicate particles and particles of crude asbestos up to a size of about $200\mu$. The fiber bundles, in part, have a diameter of up to $50\mu$ and larger. As amphibole asbestos is negatively charged, it is possible to comminute the fiber bundles to a large extent without destruction by means of a cation active wetting agent.

For this purpose, 3 kg. anthophyllite asbestos are, for instance, hydrolyzed, at room temperature, in 8 liters of water with the addition of 600 g. of a wetting agent, such as is commercially obtainable under the name Germocid, with occassional stirring for 48 hours. A subsequent treatment at 60° C. produces no further improvement. After the asbestos has settled, the dust floating on the liquid is separated off. Subsequently, the asbestos is purified several times in a centrifuge, where the not broken-down particles of asbestos crude and silicates are removed based upon their specific gravity. Subsequently, the remaining asbestos fibers are dried at about 110° C. The asbestos obtained in this manner, no longer contains any larger particles of asbestos crude and silicates, and the asbestos fiber bundles have a diameter of only about $10\mu$. The weight loss of the asbestos during the treatment and the purification process is 50 to 60% by weight.

73.5 g. of an anthophyllite asbestos pretreated in this manner are suspended in 8 liters of water. To the asbestos suspension is added, while stirring, 100 g. of a pretreated cation exchanger such as Lewatit Sp 120 (registered trademark), which has been previously allowed to swell for one hour in 1 liter of water. For pretreating the ion exchanger, 250 ml. of water were added to 100 g. of the commercial material and comminuted within two hours in a milling apparatus with 250 g. of steel balls having a diameter of 2 mm. The milled material was screened by a screen with $40\mu$ mesh and dried at 80° C. Prior to the swelling, the cohering material was pulverized in a mortar.

The suspension containing the asbestos and the filler substance was homogenzied in a stirring apparatus and subsequently mixed slowly, while being stirred, with a latex of a butadiene-styrene-acrylonitrile copolymer. For this purpose, 77 ml. of a commercial aqueous latex dispersion with a content of about 40% by weight of copolymer had been diluted with 200 ml. of distilled water. Added to the suspension obtained are 500 ml. of a saturated solution of ammonium aluminum sulfate $$NH_4Al(SO_4)_2$$

(alum). The flaked out material suspension obtained thereby is finely distributed by means of a turbo stirrer. Thereafter, 1.4 liter of this finely distributed suspension was then further processed in a foil former with a diameter of 320 mm.

In the process, air is blown through the foil former filled with water, and the suspension is allowed to settle partially. The water is finally drawn off and the foil obtained is dried in a press. Subsequently, the binding substance can advantageously be cross-linked (30 minutes at 130° C.) and then the nitrile groups are saponified within 20 minutes with 0.5% KOH. The foil is subsequently washed for an hour under running water until it is free of alkali and is then stored in diluted sulfuric acid, first for two hours in 0.3 to 0.5% $H_2SO_4$ and then overnight in 2% $H_2SO_4$. This treatment with sulfuric acid has the purpose to convert the K form of the cation exchanger, namely the form with $K^+$ ions, which was produced during the saponification of the nitrile groups of the binding agent, into the H form, namely the form with $H^+$ ions. After this treatment, the asbestos cover layers are ready for use. They can be stored also in the dry condition. If bentonites are used as filler substances essentially the same process steps can be carried out.

An asbestos cover layer manufactured as per the method according to the invention is shown schematically, in cross section, in the drawing. The asbestos fibers are denoted with 1, and between the asbestos fibers, the binder agent (latex) 2 and the filler substance 3 are embedded.

Latex bonded asbestos cover layers, which were manufactured in this or a similar manner, were tested among other things, for their conductivity and mechanical properties. The following results were obtained thereby.

Asbestos cover layers with bentonites as the filler substance advantageously have a content of 20 to 50% by weight of bentonite, preferably about 30% by weight, and a latex content of 15 to 20% by weight, always referred to the weight of the finished asbestos cover layer. In this range, the conductivity is most favorable and the cover layers are gas-tight up to a pressure of more than 0.2 newton/mm.² (approximately 2 atm. g.). With higher contents of filler substance, the conductivity decreases and the permeability for water also becomes less.

Asbestos cover layers with cation exchangers as the filler substance advantageously have a cation exchanger content of 30 to 50% by weight, preferably 50% by weight and a latex content of 15 to 20% by weight. Particularly suitable cation exchangers are available under the names Duolite and Amberlite and especially Lewatit, Dowex and Juvion. Cover layers can be manufactured which are gas-tight up to a pressure of about 0.3 newton/mm.² (approximately 3 atm. g.).

Asbestos cover layers with molecular sieves as filler substances show less desirable properties because of the lesser volume increase of the filler substance and the latter's poorer stability in acid. However, gas tightness can be assured up to, for instance, 0.16 newton/mm.² (approximately 1.6 atm. g.).

Among the mechanical properties, particularly the tensile strength and the swelling were investigated. Here, it was found that the tensile strength increases with increasing bentonite and latex content, while the tensile strength decreases with increasing content of ion exchanger. This can be explained by the different structure of the filler substances. Bentonites have a very rough surface and can interlock well, while ion exchangers have a smooth surface. The strength of broken-up, bonded asbestos material, which is free of filler substances is also very low, which can be explained by the smooth nature of the individual fibers. If one ages the cover layers containing filler substances manufactured according to the invention, for 72 hours at 80° C., the strength doubles but, at the same time, the resistance increases by about 50%.

The swelling of asbestos cover layers with filler substance, is less than that of asbestos cover layers without filler substance, as was ascertained by storing for four weeks in 2.5 m. $H_2SO_4$ at 60° C. This can be explained by the fact that the asebestos fibers are held together better by the filler substance, whereby the possible expansion is less. The better coherence of asbestos cover layers containing filler substance also manifests itself by the already described increased tensile strength. In the swelling of asbestos cover layers with bentonites and ion exchangers as the filler substance, dimensional changes of only about 6 to 7% were observed under the above stated test conditions.

In summary, according to the method as per the invention, the manufacture of operationally suitable, latex bonded asbestos cover layers for electrochemical cells with an acid electrolyte is possible. For this purpose, suitable asbestos types and filler substances that can swell up are used. The manufacture is simple and can be carried out technically with good reproducibility. The asbestos cover layers prepared by the method according to the invention show a conductivity equally as good as latex bonded asbestos cover layers of paper asbestos for electrochemical cells with an alkaline electrolyte. The electric resistivity is smaller than 1 ohm·cm.² and it is approximately in the range of 0.3 to 0.8 ohm·cm.², measured in 1 m. $H_2SO_4$ at room temperature. The asbestos cover layers exhibit a tensile strength which is far above that of cover layers without filler substance, and they have good dimensional stability in an acid electrolyte, the expansion being only about 0.6 to 0.7%. The strength can be increased further by a thermal after treatment of the finished cover layers, but an increase of the resistivity by about 50% occurs here.

The asbestos cover layers manufactured according to the invention can be used in fuel cells as well as in other electrochemical cells such as storage batteries and electrolyzers.

As already explained, among the above mentioned cation exchangers available under the names Amberlite, Duolite, Dowex, Juvion and Lewatit, cation exchangers on a styrene basis are particularly suitable according to the method as per the invention, and asbestos cover layers prepared by this method especially contain these cation exchangers. These cation exchangers consist of synthetic resins, sulfonic acid groups as active groups being attached to the polystyrene resin structure (—$SO_3Na$ in the Na form and —$SO_3H$ in the H form); these cation exchangers are strong acid exchangers, they show a thermal resistance up to 120° C. and more, and they have a stability in the pH range from 0 to 14. Generally they have a spherical form with a grain size of 0.3 to 2.0 mm., the shipping density or bulk density is from 700 to 900 g./l. These cation exchangers generally are cross-linked, the cross-linkage being obtained by incorporation of divinylbenzene into the polystyrene matrix. The standard cross-linkage generally is 8%, but it may also be 10% and more. The above mentioned cation exchanger named Lewatit SP 120, for example, has a standard cross-linkage of more than 8%; this strong acid cation exchanger in form of spherical particles with a grain size of 0.3 to 2.0 mm. has a macroporous nature, shows a thermal stability up to 120° C. and a chemical stability in all pH ranges, the shipping density in the swelled condition of the Na form is from 700 to 800 g./l.

Besides cation exchangers with a polystyrene basis and with sulfonic acid groups, cation exchangers with a phenolic resin basis also can be used. These cation exchangers which generally have —$CH_2SO_3H$ groups as active groups, however show a reduced thermal stability.

According to the method for the manufacture of latex bonded asbestos cover layers as per the invention cation active wetting agents are used to upgrade or break down the asbestos fiber bundles. Wetting agents like these, having surface active properties, particularly are in the form of amine salts, like

and in the form of quaternary ammonium salts. The above mentioned cation active wetting agent available under the name Germocid, for example, comprises quaternary ammonium compounds.

What is claimed is:

1. A method for the manufacture of latex bonded asbestos cover layers for electrochemical cells with an acid electrolyte, which comprises breaking up amphibole asbestos fiber bundles by a cation active wetting agent in aqueous medium, removing the nonbroken-up particles, forming an aqueous suspension from the asbestos fibers and filler substances in the form of powders, said filler substances having a grain size of up to 100μ, said filler substances being stable in 2.5 m. $H_2SO_4$ at temperatures up to 60° C., and having ionic conductivity and being swellable up to several times their volume, mixing this suspension with a latex of an acid resistant binder selected from the group consisting of hydrophilic substances and substances that can be treated to be hydrophilic and further forming a finished asbestos cover layer containing 20 to 50% by weight of filler substances, 15 to 20% by weight of binder, the balance being asbestos.

2. The method of claim 1, wherein bentonite is used as the filler substance.

3. The method of claim 1, wherein cation exchangers which are wet milled to the required grain size prior to admixture, serve as the filler substance.

4. The method of claim 1, wherein a latex of a butadiene-styrene-acrylonitrile copolymer is used and is made hydrophilic by saponification with an alkali solution.

5. The method of claim 1, wherein the binder is crosslinked.

6. The method of claim 1, wherein the asbestos fibers are anthophyllite asbestos fibers.

7. Asbestos cover layer consisting of 20 to 50% by weight of bentonite and 15 to 20% by weight of hydrophilic binder flaked out from a latex, the balance being amphibole asbestos formed by breaking up asbestos fiber bundles by a cation active wetting agent and from which the nonbroken-up particles have been removed.

8. Asbestos cover layer, consisting of 30 to 50% by weight of cation exchanger with a styrene matrix and 15 to 20% by weight of hydrophilic binder flaked out from a latex, the rest being amphibole asbestos formed by breaking up asbestos fiber bundles by a cation active wetting agent and from which the nonbroken-up particles have been removed.

9. The method of claim 3, wherein the cation exchangers are styrene based.

10. A method of producing latex bonded asbestos cover layers for electrochemical cells with acid electrolyte, wherein 72 to 90 weight parts of amphibole asbestos fiber bundles in water are treated with 14 to 18 weight parts of a cation active wetting agent, removing the nonopened particles to produce approximately 36 weight parts of opened asbestos fibers and forming an aqueous suspension from these asbestos fibers and 49 weight parts of a pulverulent filler that is stable in 2.5 m. $H_2SO_4$ at temperatures up to 60° C., is ion-conductive, swellable up to several times its volume, whose grain size is up to 100$\mu$ and is selected from the group of the cation exchangers and bentonite, mixing this suspension with an aqueous latex dispersion which contains 15% by weight of a binder that is resistant to sulfuric acid and is selected from the group consisting of hydrophilic substances and substances which can be treated to be hydrophilic, and further forming a finished asbestos layer.

References Cited

UNITED STATES PATENTS

| | | | |
|---|---|---|---|
| 3,540,961 | 11/1970 | Shipp et al. | 260—28 |
| 3,491,046 | 1/1970 | Pachuta | 260—28 |
| 2,910,922 | 11/1959 | Horning | 260—28 |
| 3,316,194 | 4/1967 | Payne | 260—28 |
| 3,481,737 | 12/1969 | Siebenberg et al. | 136—86 R |
| 3,486,946 | 12/1969 | Duddy | 136—146 |
| 3,558,364 | 1/1971 | Krey | 136—146 |

OTHER REFERENCES

Kirk-Othmer Encyclopedia of Science & Technology, 2nd ed., vol. 2, Interscience, New York, N.Y. (1963), pp. 734–736 and 738–739.

MORRIS LIEBMAN, Primary Examiner

H. H. FLETCHER, Assistant Examiner

U.S. Cl. X.R.

136—86 R, 146; 260—42.47